Figure 1:
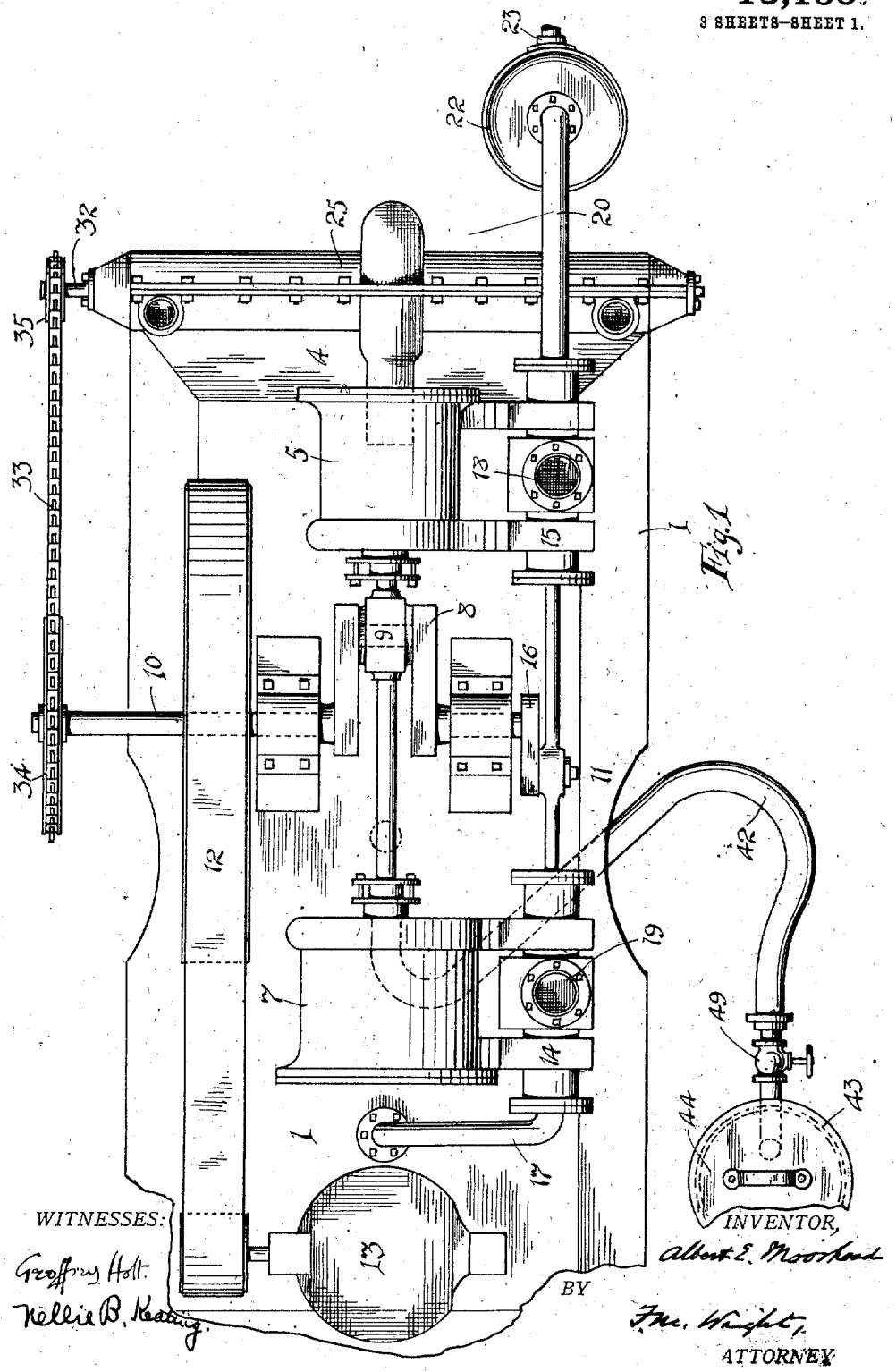

A. E. MOORHEAD.

PNEUMATIC CLEANSING APPARATUS.

APPLICATION FILED AUG. 28, 1908.

Reissued Oct. 11, 1910.

13,155.

3 SHEETS—SHEET 1.

WITNESSES:

Geoffrey Holt.

Nellie B. Keating.

INVENTOR,

Albert E. Moorhead

BY

Fred. Wright,

ATTORNEY.

A. E. MOORHEAD.

PNEUMATIC CLEANSING APPARATUS.

APPLICATION FILED AUG. 28, 1908.

Reissued Oct. 11, 1910.

13,155.

3 SHEETS—SHEET 2.

A. E. MOORHEAD.

PNEUMATIC CLEANSING APPARATUS.

APPLICATION FILED AUG. 28, 1908.

Reissued Oct. 11, 1910.

13,155.

3 SHEETS—SHEET 3.

WITNESSES:

Geoffrey Holt

Nellie B. Keating

INVENTOR,

Albert E. Moorhead

BY

Fm. Wright,

ATTORNEY.

UNITED STATES PATENT OFFICE.

ALBERT E. MOORHEAD, OF SAN FRANCISCO, CALIFORNIA, ASSIGNOR TO MECHANICAL DUST SUCTION COMPANY, OF SAN FRANCISCO, CALIFORNIA, A CORPORATION OF CALIFORNIA.

PNEUMATIC CLEANSING APPARATUS.

13,155. Specification of Reissued Letters Patent. Reissued Oct. 11, 1910.

Original No. 820,007, dated May 8, 1906, Serial No. 263,973. Application for reissue filed August 28, 1908. Serial No. 450,791.

*To all whom it may concern:*

Be it known that I, ALBERT E. MOORHEAD, a citizen of the United States of America, residing at San Francisco, county of San Francisco, and State of California, have invented certain new and useful Improvements in Pneumatic Cleansing Apparatus; and I hereby declare the following to be a full, clear, and exact description of the same, reference being had to the accompanying drawings, forming a part of this specification.

My invention relates to certain improvements in pneumatic apparatus for cleansing the interior of houses, carpets especially, and removing therefrom by pneumatic means dust and other impurities collecting and in disposing such dust and impurities by means as hereinafter described, and illustrated by drawings that form a part of this specification.

My invention consists in subjecting the air, dust, and dirt in their passage to and through collecting-chambers to agitation and saturation with water or a liquid solution that combines with and causes complete precipitation of the particles and at the same time destroys their infective nature by formaldehyde or other sterilizing substance held in solution by the water.

My invention also includes mechanical agitating devices, preferably of a rotary nature, interposed in the conduits and receptacles for the exhausted impure air and in means to remove from a receiver the accumulated dirt, dust, and other impurities, as hereinafter explained.

The objects of my invention are to saturate, collect, precipitate, and sterilize the dust and impurities that come from houses and carpets when cleansed and prevent their escape and dissemination in the external air.

To these ends I provide apparatus as shown in the drawings herewith.

Figure 2:
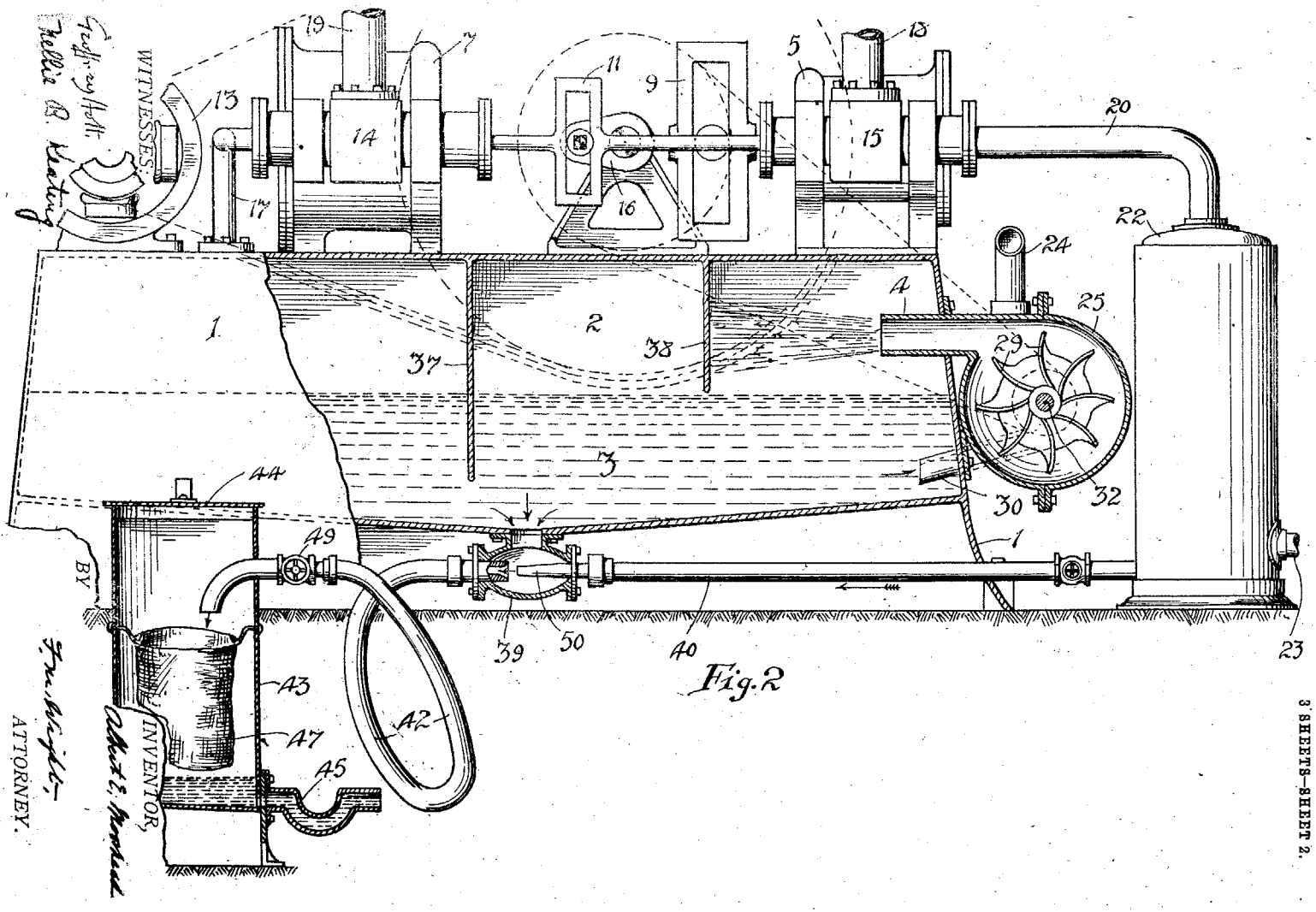
Figure 3:
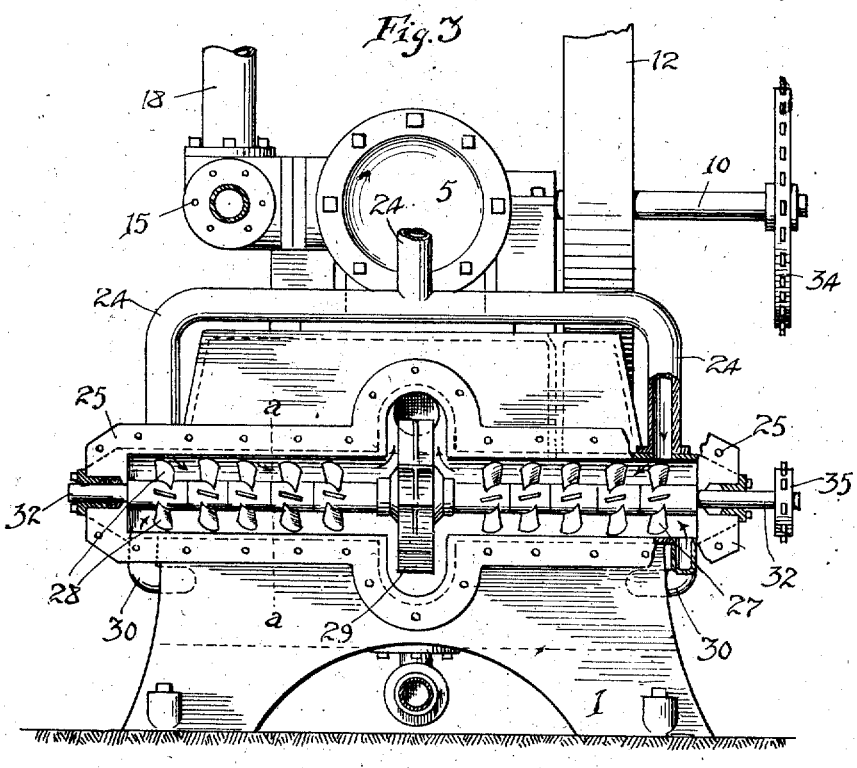

Figure 1 is a plan view of cleansing apparatus constructed according to my invention; Fig. 2 a side view partly in section, of the same apparatus; Fig. 3, an end view of the device shown in Figs. 1 and 2 with some of the parts omitted, and Fig. 4 a transverse section on the line *a a* in Fig. 3.

In the collection and removal of dirt and fine dust from carpets it is common to pass such dust through water to arrest the particles and prevent them from escaping into the air. This manner of operating only partially serves the purpose intended, because air charged with fine dust becomes "repellant," as it is called, the dust enveloping globules of water that will pass through the main body of the liquid and be discharged without disintegration. This same phenomenon occurs in streams of air loaded with dust, such streams forming dust-lined passages through a stratum of water of whatever depth and escaping when charged with dust, and there is the further objection that simple saturation with water alone, even when complete, removes but does not destroy disease germs contained in the dust. To obviate these several impediments, I apply violent mechanical agitation to the liquid and dust-laden air so that each particle in the latter will be saturated, arrested, and precipitated, so the air will escape pure. Instead of simple water I employ a solution containing any of the well-known sterilizing substances, such as formaldehyde, which devitalizes deleterious atoms removed from carpets, rendering the whole process aseptic as well as a renovating one.

The mechanical apparatus for agitation can take a variety of forms, rotary action, being preferable and most effective, is preferably employed, as shown in the drawings, now to be referred to.

1 is a main supporting-frame of box construction that serves as a tank 2 to contain water or a liquid solution 3 and acts as a receptacle for dust and dirt discharged therein through the pipe 4, as shown in Fig. 2.

5 is an air-compressing engine or pump, and 7 a vacuum-pump, both driven from a crank 8 and yoke 9 by means of a shaft 10, a band 12, and in the present case by an electric motor 13, mounted on the main frame 1, so the operating parts are self-contained and portable.

The valve-chambers 14 and 15 contain the usual distributing-valves operated by the crank 16 and yoke 11. 17 and 18 are induction pipes, and 19 and 20 eduction or discharge pipes, the latter leading to a receiver 22, from which a pipe or hose 23 conducts air under pressure to devices for cleansing carpets, having the customary nozzles and other appliances for the purpose. These latter-named devices I do not explain here, they being fully described in Letters Patent granted to me, No. 784,801, dated March 14, 1905, No. 787,389, dated April 18, 1905, No. 787,388, dated April 18, 1905, and No. 791,567, dated June 6, 1905, all in pneumatic cleansing apparatus.

Figure 4:
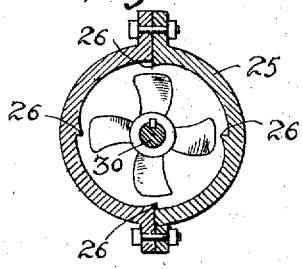

The vacuum-pump 7 draws air from the chamber 2 in the bed-plate or main frame and discharges through the pipe 19, the air being cleansed and purified by means now to be described. Dust and dirt from the cleaning devices is by reason of the vacuum maintained in the chamber 2 drawn in through the pipe 24 that enters at each end the agitating-chamber 25, as shown in Fig. 3. In this chamber 25 are right and left helical impellers 27, 28, that slowly move the dirt, dust, and water toward the center and to the fan 29, that acting by centrifugal effect circulates the water or solution 3 through the pipes 30 and discharges it into the chamber 2, as indicated in Fig. 2. As the pipes 30 connect the main chamber 2 and the ends of the chamber 25, this latter is kept full of the water or solution 3 to approximately the same level as in the chamber 2, and the agitation of the impellers 28 and the fan 29 completely disintegrate and saturate the substances contained in the foul air, permitting their precipitation in the chamber 2. The impellers 28 and fan 29 are mounted on a shaft 32, driven by a chain 33 from the main crank-shaft 10 by means of the wheels 34, 35, as seen in Fig. 1. In the plane of the impellers 28 the chamber 25 is preferably made of a shallow volute form, as indicated at Fig. 4, to deflect the water and air inward, and thus increase the agitating effect of the impellers 28 and is made separable, so as to remove and replace the shaft 32. In the chamber 2 are placed diaphragms or dams 37, 38, which may be of any required depth, beneath which air entering at 4 must pass before being drawn out through the pipe 17. Means are provided for removing accumulated sludge from the bottom of the tank 2, consisting of an ejector 39 and connected parts, as shown in Fig. 2. The pipe 40 connects to the air-receiver 22 or any other available source of air or water under pressure, and a hose 42 leads from the ejector 39 to a receiver 43, having a loose top 44 and a waste connection 45, that may be provided with a trap, as shown, and lead to a sewer or other suitable place of deposit.

In the case of emptying into city sewers a screen-bag 47 to remove solids is suspended in the receiver 43. This bag when loaded is removed through the top of the receiver and emptied. This apparatus for clearing the chamber 2 being used at intervals only is controlled by a valve 49 in the discharge-pipe 42, also by shutting off the impelling air or water passing through the pipe 40 and nozzle 50. The receiver 43 can be stationary or mounted on the main frame 1, so the whole will be self-contained and portable, as is required in moving from house to house.

Having thus explained the nature and objects of my invention, what I claim as new, and desire to secure by Letters Patent, is:—

1. In pneumatic cleansing apparatus, a hollow base, having a collecting-tank or receiver therein, an air-exhaust pump, a pipe connection between said exhaust-pump and said tank, an outlet from said exhaust-pump, an inlet-pipe for dust and refuse from carpet cleansing connected with said tank, to discharge into the same, and a device for agitating said dust and refuse mixed with the air and liquid, and forcing it into the tank located between said inlet pipe and the tank, substantially as described.

2. In pneumatic cleansing apparatus, a hollow base, having a collecting-tank or receiver therein, an air-compressor pump and an air-exhaust pump mounted thereon, a compressed-air receiver, a pipe connection between said compressor-pump and said receiver, a pipe connection between said exhaust-pump and said tank, an outlet for said exhaust pump, an air-outlet for said compressor-pump, an outlet in the bottom of said tank, an ejector connected with said outlet, and a pipe connection between said ejector and a store of compressed air, with means for cutting off said connection, substantially as described.

3. In pneumatic cleansing apparatus, a hollow base, having a collecting-tank or receiver therein, an air-compressor pump and an air-exhaust pump mounted thereon, a compressed-air receiver, a pipe connection between said compressor-pump and said receiver, a pipe connection between said exhaust-pump and said tank, an outlet for said exhaust-pump, an air inlet for said compressor pump, an inlet-pipe for dust and refuse connected with the tank, into which it discharges, and a device for agitating and forcing said refuse into said tank between the tank and said inlet-pipe, substantially as described.

4. In pneumatic cleansing apparatus, a hollow base, having a collecting-tank or receiver therein, an air-compressor pump and an air-exhaust pump mounted thereon, a compressed-air receiver, a pipe connection between said compressor-pump and said receiver, a pipe connection between said exhaust-pump and said tank, an outlet for said exhaust pump, an air-inlet for said compressor-pump, an inlet-pipe for dust and refuse connected to discharge into the tank, and a device for agitating and forcing said refuse into said tank between the tank and said inlet-pipe, said tank and agitating device containing an antiseptic solution for sterilizing said refuse, substantially as described.

5. In pneumatic cleansing apparatus, a hollow base, having a collecting-tank or receiver therein, an air-compressor pump and an air-exhaust pump mounted thereon, a compressed air receiver, a pipe connection between said compressor-pump and said receiver, a pipe connection between said exhaust-pump and said tank, an outlet for said exhaust-pump, an air-inlet for said compressor-pump, an inlet-pipe for dust and refuse connected to discharge into the tank, an agitating-chamber between said inlet-pipe and said tank, containing an antiseptic solution, and rotatory helical impellers for moving said refuse toward and delivering it to said tank, substantially as specified.

6. In pneumatic cleansing apparatus, a hollow base, having a collecting-tank or receiver therein, an air-compressor pump and an air-exhaust pump mounted thereon, a compressed-air receiver, a pipe connection between said compressor-pump and said receiver, a pipe connection between said exhaust-pump and said tank, an outlet for said exhaust pump, an air-inlet for said compressor-pump, an elongated agitating chamber connected with said tank, an inlet-pipe for dust and refuse connected with said agitating-chamber at its ends, said chamber containing an antiseptic solution, rotatory helical impellers in said chamber for agitating said refuse and moving it mechanically toward the center, and a central fan-impeller for discharging said refuse into said tank, substantially as described.

7. In pneumatic cleansing apparatus, a collecting-tank, an air-exhaust pump, a pipe connection from the tank to said exhaust pump, an elongated agitating-chamber connected with said tank, inlet-pipes at the ends of said agitating-chamber for induction of dust and refuse, a rotatory shaft within said agitating-chamber with helical impeller-blades for moving said dust and refuse toward the center of the chamber, and a fan-impeller at the middle of the shaft for discharging said refuse into the tank, substantially as specified.

8. In pneumatic cleansing apparatus, a collecting-tank for dust and refuse, an air-exhaust pump connected therewith, an agitating-chamber communicating with said tank, an inlet pipe for dust and refuse to said chamber, and rotatory mechanical impellers in said chamber for agitating and moving the refuse, said chamber having an interior involute contour in cross-section, substantially as specified.

9. In pneumatic cleansing apparatus, a hollow base, having a collecting-tank or receiver therein, an air-compressor pump and an air-exhaust pump mounted thereon, an agitating and mixing chamber connected with said tank, rotatory agitators in said chamber, a compressed-air receiver, a pipe connection between said compressor-pump and said receiver, a pipe connection between said exhaust-pump and said tank, and a common cross-shaft mounted on said base, with operative connections for working said pumps and the said rotatory agitators, substantially as specified.

10. In pneumatic cleansing apparatus, a collecting-tank for dust and refuse, means for exhausting air therefrom, an elongated agitating and mixing chamber connected with said tank, inlet-pipes for dust and refuse at the ends of said chamber, rotatory helical impellers within said chamber for agitating and moving said refuse, and a rotatory fan of larger diameter than the impellers for discharging the refuse into said tank, substantially as described.

ALBERT E. MOORHEAD.

Witnesses:
FRANCIS M. WRIGHT,
NELLIE B. KEATING.